US010336315B2

(12) United States Patent
Nefcy et al.

(10) Patent No.: US 10,336,315 B2
(45) Date of Patent: Jul. 2, 2019

(54) TORQUE MODULATION IN A HYBRID VEHICLE DOWNSHIFT DURING REGENERATIVE BRAKING

(71) Applicant: Ford Global Technologies, LLC, Dearborn, MI (US)

(72) Inventors: Barney D Nefcy, Novi, MI (US); Francis Thomas Connolly, Ann Arbor, MI (US); Dan Colvin, Farmington Hills, MI (US); Walt Joseph Ortmann, Saline, MI (US); Marvin Paul Kraska, Dearborn, MI (US); Dale Scott Crombez, Livonia, MI (US); Mark Steven Yamazaki, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 220 days.

(21) Appl. No.: 15/335,725

(22) Filed: Oct. 27, 2016

(65) Prior Publication Data
US 2017/0043760 A1 Feb. 16, 2017

Related U.S. Application Data

(63) Continuation of application No. 13/086,048, filed on Apr. 13, 2011, now Pat. No. 9,493,148.

(51) Int. Cl.
*B60W 20/10* (2016.01)
*B60W 10/06* (2006.01)
(Continued)

(52) U.S. Cl.
CPC .............. *B60W 20/30* (2013.01); *B60K 6/48* (2013.01); *B60W 10/06* (2013.01); *B60W 10/08* (2013.01); *B60W 10/10* (2013.01);
*B60W 10/11* (2013.01); *B60W 10/115* (2013.01); *B60W 10/184* (2013.01); *B60W 10/188* (2013.01); *B60W 20/10* (2013.01); *B60W 20/15* (2016.01); *B60W 30/18127* (2013.01); *B60W 30/19* (2013.01); *B60W 30/20* (2013.01); *F16H 61/04* (2013.01); *F16H 63/502* (2013.01); *B60K 2006/4825* (2013.01); *B60W 2030/18081* (2013.01); *B60W 2030/206* (2013.01);
(Continued)

(58) Field of Classification Search
None
See application file for complete search history.

(56) References Cited

U.S. PATENT DOCUMENTS 5,923,093 A 7/1999 Tabata et al.
6,278,916 B1 8/2001 Crombez
(Continued)

OTHER PUBLICATIONS

Shorter Oxford English Dictionary (6th Edition) p. 1813.

*Primary Examiner* — Kevin P Mahne
(74) *Attorney, Agent, or Firm* — Diederiks & Whitelaw, PLC.

(57) ABSTRACT

A controller and a control strategy minimizes shift shock in a hybrid electric vehicle during a downshift conducted while the vehicle is in a regenerative braking mode by maintaining total powertrain torque at a desired target during the downshift. The controller has three preferable modes including modulating just engine torque, modulating just electric motor torque or simultaneously modulating both motor and engine torque.

22 Claims, 5 Drawing Sheets

(51) Int. Cl.

| | | |
|---|---|---|
| *B60W 10/08* | (2006.01) | |
| *B60W 10/115* | (2012.01) | |
| *B60W 10/184* | (2012.01) | |
| *B60W 20/15* | (2016.01) | |
| *B60W 30/18* | (2012.01) | |
| *B60W 30/20* | (2006.01) | |
| *B60W 20/30* | (2016.01) | |
| *B60W 10/10* | (2012.01) | |
| *B60K 6/48* | (2007.10) | |
| *B60W 10/11* | (2012.01) | |
| *B60W 10/188* | (2012.01) | |
| *B60W 30/19* | (2012.01) | |
| *F16H 61/04* | (2006.01) | |
| *F16H 63/50* | (2006.01) | |

(52) U.S. Cl.
CPC ............... *B60W 2710/0666* (2013.01); *B60W 2710/083* (2013.01); *B60W 2720/30* (2013.01); *B60Y 2200/92* (2013.01); *B60Y 2300/18125* (2013.01); *B60Y 2300/19* (2013.01); *B60Y 2400/112* (2013.01); *B60Y 2400/73* (2013.01); *Y02T 10/6221* (2013.01); *Y02T 10/6252* (2013.01); *Y02T 10/6286* (2013.01); *Y10S 903/93* (2013.01)

(56) References Cited

U.S. PATENT DOCUMENTS

| | | |
|---|---|---|
| 6,574,535 B1 | 6/2003 | Morris et al. |
| 6,585,066 B1 | 7/2003 | Koneda et al. |
| 6,811,229 B2 | 11/2004 | Soga |
| 7,128,677 B2 | 10/2006 | Supina et al. |
| 7,223,201 B2 | 5/2007 | Colvin et al. |
| 7,261,671 B2 | 8/2007 | Ortmann et al. |
| 7,331,899 B2 | 2/2008 | Ortmann et al. |
| 7,493,980 B2 | 2/2009 | Hidaka |
| 2002/0023789 A1 | 2/2002 | Morisawa et al. |
| 2002/0116101 A1 | 8/2002 | Hashiba et al. |
| 2003/0184152 A1 | 10/2003 | Cikanek et al. |
| 2005/0054480 A1 | 3/2005 | Ortmann et al. |
| 2006/0102394 A1 | 5/2006 | Oliver |
| 2007/0102208 A1* | 5/2007 | Okuda ............... B60K 6/48 180/65.31 |
| 2007/0228822 A1 | 10/2007 | Hirata |
| 2008/0106227 A1 | 5/2008 | Gebert et al. |
| 2008/0208422 A1 | 8/2008 | Shibata et al. |
| 2008/0318728 A1* | 12/2008 | Soliman ............... B60K 6/442 477/4 |
| 2009/0071733 A1 | 3/2009 | Duan et al. |
| 2009/0118885 A1 | 5/2009 | Heap et al. |
| 2009/0118941 A1 | 5/2009 | Heap |
| 2009/0143950 A1 | 6/2009 | Hasegawa et al. |
| 2009/0149295 A1* | 6/2009 | Yamamoto ............... B60K 6/48 477/109 |
| 2009/0291801 A1 | 11/2009 | Matsubara et al. |
| 2010/0036575 A1 | 2/2010 | Yurgil |
| 2010/0304922 A1* | 12/2010 | Ohkubo ............... B60K 6/48 477/4 |
| 2010/0312447 A1 | 12/2010 | Perkins |
| 2011/0021311 A1* | 1/2011 | Kim ............... B60W 10/08 477/3 |
| 2011/0118920 A1 | 5/2011 | Kim |
| 2011/0144877 A1* | 6/2011 | Niwa ............... B60L 7/18 701/70 |
| 2012/0056470 A1* | 3/2012 | Kim ............... B60L 7/18 303/3 |
| 2012/0078475 A1* | 3/2012 | Li ............... B60K 6/48 701/51 |
| 2012/0101676 A1* | 4/2012 | Ichioka ............... B60K 6/365 701/22 |
| 2012/0101697 A1 | 4/2012 | Hawkins et al. |

\* cited by examiner

TORQUE MODULATION IN A HYBRID VEHICLE DOWNSHIFT DURING REGENERATIVE BRAKING

CROSS REFERENCE TO RELATED APPLICATIONS

The present application represents a continuation application of U.S. patent application Ser. No. 13/086,048, which was filed on Apr. 13, 2011 and titled "Torque Modulation in a Hybrid Vehicle Downshift During Regenerative Braking". The entire content of this application is incorporated herein by reference.

BACKGROUND OF THE INVENTION

Field of the Invention

The present invention pertains to the art of hybrid vehicle powertrains and, more specifically, modulating torque in a hybrid vehicle powertrain during a ratio change of the transmission that occurs during regenerative braking.

Discussion of the Prior Art

A hybrid vehicle powertrain typically includes an electric motor, such as a high voltage induction motor, wherein driving torque of an engine is supplemented with electric motor torque produced by the electric motor. The combined engine torque and electric motor torque is transferred to vehicle traction wheels through a multiple ratio power transmission mechanism. A wet clutch assembly may be included in the power flow path between a torque input element of the multiple-ratio power transmission mechanism and a crankshaft of the engine. An example of a hybrid electric vehicle powertrain of this type is disclosed in U.S. Pat. No. 6,585,066, which is assigned to the assignee of the present invention.

Attempts have been made to reduce power losses normally associated with torque converter automatic transmissions by adding an electric motor. A powertrain configuration of this type combines the performance of an internal combustion engine with the advantages of an electric motor that complements the speed and torque characteristics of the engine. The hybrid arrangement also permits the engine to be deactivated when the vehicle is at rest or disconnected from the power flow path of the powertrain as the electric motor supplies driving torque. Such a hybrid arrangement improves fuel economy while reducing undesirable exhaust gas emissions.

During a process commonly referred to as regenerative braking in a hybrid powertrain of this type, charging a high voltage battery during vehicle deceleration collects the kinetic energy stored in the moving vehicle. During regenerative braking, required braking torque is allocated between a set of friction brakes and the electric motor, which acts as a generator. The amount of braking torque required as the vehicle decelerates is apportioned in real time by a control system between the hydraulic, mechanical friction braking hardware and the electric powertrain regenerative braking. The apportionment of wheel braking torque between friction and regenerative braking is balanced through the deceleration process to achieve as much regeneration as possible to improve fuel economy.

In the case of a coasting downshift for a hybrid electric vehicle, the regenerative braking function coincides with the coast mode. In some hybrid electric vehicles, since the motor is located between the engine and the transmission, the coast downshift is done with a significant level of negative torque at the input to the transmission. This negative regenerative braking input torque is sometimes much higher than the negative input torque typically experienced in conventional powertrain vehicles with step ratio transmissions during coasting or braking deceleration. This operating condition differs from operating conditions found in conventional powertrains, where coasting downshifts are done with only a slight negative or positive torque at the transmission input. The negative torque in the hybrid powertrain will cause shift shock in a manner similar to that found in a power-on upshift in a conventional powertrain. For example, during a power-on upshift, the conventional transmission remains initially in the upshifted torque ratio and a torque ratio change takes place before speed ratio change. During the speed ratio change, there is no significant change in wheel torque. The length of the shift depends on the amount of torque that the engine is producing and the amount of the effective inertia mass connected to the engine which is felt by the driver as a shock. Shift quality may be improved by controlling transmission input torque such as by reducing transmission input torque during a power-on upshift by retarding the engine spark to reduce engine output torque. This improves both the durability of the on-coming friction element and the smoothness of the upshift event. Torque modulation using spark retardation will satisfy the timing and repeatability requirements to satisfy shift quality targets, but this wastes some energy during the shift, which can only reduce torque, not increase it. Torque modulation also can be accomplished by using a fuel cut-off to reduce engine torque, but restoring engine torque following a shift event often is not repeatable using fuel control. In a conventional powertrain using a hydrokinetic torque converter, a coast mode occurs whenever the accelerator pedal is off, both with and without braking. As the vehicle slows, a coasting downshift must be executed to keep the engine speed within the desired range. In the case of downshifts during regenerative braking, drivability problems result if shift shock is not addressed.

Prior solutions to this problem have addressed the idea of removing regenerative torque during shift events by switching from regeneration to friction braking and back again. However, such methods have the problem that the transfer to friction braking leads or lags the duration of the shift event and such solutions tend to require overly complicated control systems. Therefore there exists a need in the art for a system that can maintain good shift quality when performing a downshift between gear ratios during regenerative braking in a hybrid vehicle.

SUMMARY OF THE INVENTION

The present invention is directed to a controller and a control strategy for reducing shift shock in a hybrid electric vehicle powertrain during a downshift conducted while the vehicle is in a regenerative braking mode by maintaining total powertrain torque constant at a desired target during the downshift. The hybrid electric vehicle has an engine, an electric motor, a battery connected to the electric motor, a set of drive wheels, an automatic transmission including multiple gear ratios for receiving a first input torque generated by the engine and delivering a total powertrain output torque to the set of drive wheels, and a controller configured to effect a downshift between gear ratios during regenerative braking while maintaining the output torque at a constant value.

Although shifting during regenerative braking tends to cause variations in the total powertrain output torque that is felt as a shift shock, the controller reduces the shift shock by sending control signals to the powertrain to control the amount of total powertrain output torque delivered from the transmission to the set of drive wheels. Specifically, the controller regulates a downshift between gear ratios during regenerative braking while maintaining the output torque constant during the downshift. The controller also provides control signals to the engine and motor for generating a first input torque with the engine and generating a second input torque with the motor. The controller preferably takes further measures to reduce shift shock, such as maintaining the total powertrain output torque at a constant level by modulating the first input torque or second input torque and varying a friction braking force applied to drive wheels of the vehicle through friction brakes to counteract variations which tend to be caused by the regenerative braking in the transmission during the downshift. The controller has three preferable modes including: modulating just engine torque; modulating just electric motor torque; or simultaneously modulating both electric motor and engine torque. Preferably, the controller removes the regenerative braking before the downshift and reinstates the regenerative braking after the downshift. In another embodiment, the controller regulates the amount of regeneration braking during both torque and inertia phases of the downshift. In particular, the controller also decreases an amount of friction braking during a torque phase of the downshift and restores the amount of friction braking during the inertia phase. The controller determines timing for applying friction braking by predicting a lag time associated with the friction braking and compensating for the lag time.

Additional objects, features and advantages of the present invention will become more readily apparent from the following detailed description of preferred embodiments when taken in conjunction with the drawings wherein like reference numerals refer to corresponding parts in the several views.

DETAILED DESCRIPTION OF THE PREFERRED EMBODIMENTS

Figure 1:
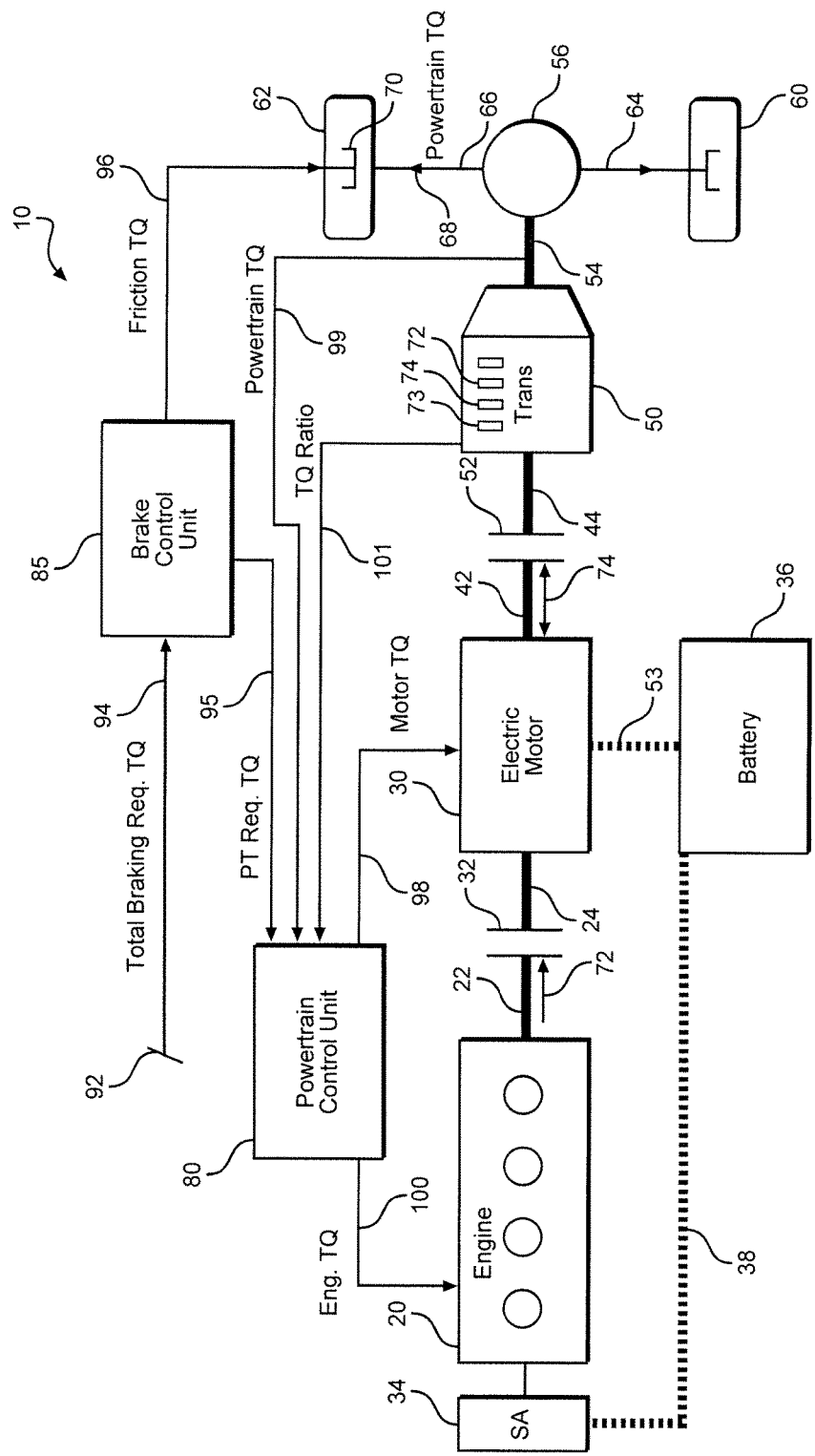
FIG. 1 is a schematic diagram of a hybrid vehicle powertrain including an internal combustion engine, an electric motor, a friction braking system and a multiple-ratio automatic transmission.

With initial reference to FIG. 1, there is schematically shown a hybrid electric vehicle powertrain system 10 for a hybrid electric vehicle. As depicted, an internal combustion engine 20 has an output shaft 22 connected to an input shaft 24 of an electric motor 30 through an engine clutch 32. Internal combustion engine 20 is also connected to a starter motor 34 used to start engine 20. Starter motor 34 is also connected to a battery 36 through wiring 38 so as to be also used as a generator to produce electric energy that is stored in a battery 36. Electric motor 30 has an output shaft 42 that is connected to an input shaft 44 of an automatic transmission 50 through a motor clutch 52. Electric motor 30 is also linked to battery 36 through a connecting wiring 53. Transmission 50 includes multiple gear ratios and is connected to a drive shaft 54 that, in-turn, is connected to a differential 56. Left and right drive wheels 60, 62 are connected to differential 56 through left and right axles 64, 66. With this arrangement, multiple gear ratio automatic transmission 50 transmits a powertrain output torque 68, indicated at 68, to drive wheels 60, 62, while drive wheels 60, 62 are provided with friction brakes 70 for applying a braking force to slow the hybrid electric vehicle.

Engine 20 is preferably an internal combustion engine, such as a gasoline or diesel powered engine, and is a primary source of power for powertrain system 10. As noted above, when running, engine 20 can provide power to starter motor 34 so that motor 34 will generate electric energy for storage in battery 36. Engine 20 also provides power through engine clutch 32 to electric motor 30 so that electric motor 30 can act as a generator and produce electric energy for storage in battery 36. More specifically, engine 20 generates a first input torque 72 that is supplied to electric motor 30. To drive the vehicle with engine 20, at least a portion of first input torque 72 passes through motor 30 to multiple ratio transmission 50 through motor clutch 52. Depending on the particular operating mode of the hybrid electric vehicle as will be detailed further below, electric motor 30 will either send power to battery 36 or convert electric energy stored in battery 36 into a second input torque 74 that is also sent to multiple ratio transmission 50. When generating electrical power for storage in battery 36, electric motor 30 obtains power either from internal combustion engine 20 in a driving mode or from the inertia in the hybrid electric vehicle as motor 30 acts as a brake in what is commonly referred to as a regenerative braking mode. Depending on whether engine clutch 32 and motor clutch 52 are engaged or disengaged determines which input torque(s) 72, 74 is transferred to transmission 50. For example, if engine clutch 32 is disengaged, only second torque 74 is supplied from motor 30. However, if both clutches 32, 52 are engaged, then first and second input torques 72, 74 are supplied by both engine 20 and motor 30. Of course, if drive torque is only desired from engine 20, both clutches 32 and 52 are engaged, but motor 30 is not energized, such that first input torque 72 is only supplied by engine 20.

Automatic transmission 50 preferably includes several planetary gearsets (not shown) that are selectively placed in different gear ratios by selective engagement of a plurality of friction elements 72-74 in order to establish the desired multiple drive ratios. For instance, friction elements 72-74 can be constituted by an oncoming friction element 72 and an offgoing friction element 73 and a forward clutch 74. Basically, transmission 50 is automatically shifted from one ratio to another based on the needs of the hybrid electric vehicle. Transmission 50 then provides powertrain output torque 68 to transmission output shaft 54 connected to differential 56 that ultimately drives wheels 60, 62. The kinetic details of transmission 50 are not important to the present invention and can be established by a wide range of known transmission arrangements, such as the transmission found in U.S. Pat. No. 7,223,201, which is specifically incorporated herein by reference. Other examples of transmissions that can be employed with the invention are found in U.S. Pat. No. 7,128,677, which is also incorporated herein by reference. While these transmission arrangements are presented as examples, any multiple ratio transmission that accepts torque input from an internal combustion engine and an electric motor and then provides torque to an output shaft at the different ratios is acceptable.

System 10 also includes powertrain control unit 80 and a brake control unit 85 collectively constituting a vehicle controller. Based on repositioning a brake pedal 92, a driver provides a total braking torque requirement signal 94 when the driver wishes to slow the hybrid electrical vehicle. The more the driver depresses pedal 92, the more braking torque is requested. Brake control unit 85 functions to apportion the total braking torque between a powertrain braking torque signal 95, representing the amount of torque to be obtained by regenerative braking, and friction braking torque signal 96, representing the amount of torque to be obtained through friction brakes 70. In response, powertrain control unit 80 sends a motor torque signal 98 to electric motor 30 representing the requisite amount of torque to be provided by regenerative braking. Powertrain control unit 60 also receives torque ratio signals 99 from transmission 50 regarding shifting from one speed ratio to another, such as during a gear shift as discussed in more detail below with reference to FIGS. 2-5, and sends an engine torque signal 100 to engine 20 indicating how much engine torque is required at a given time. A powertrain torque signal 101, representing an amount of total powertrain torque 68, is also sent to control unit 80 during the gear shift.

Figure 2:
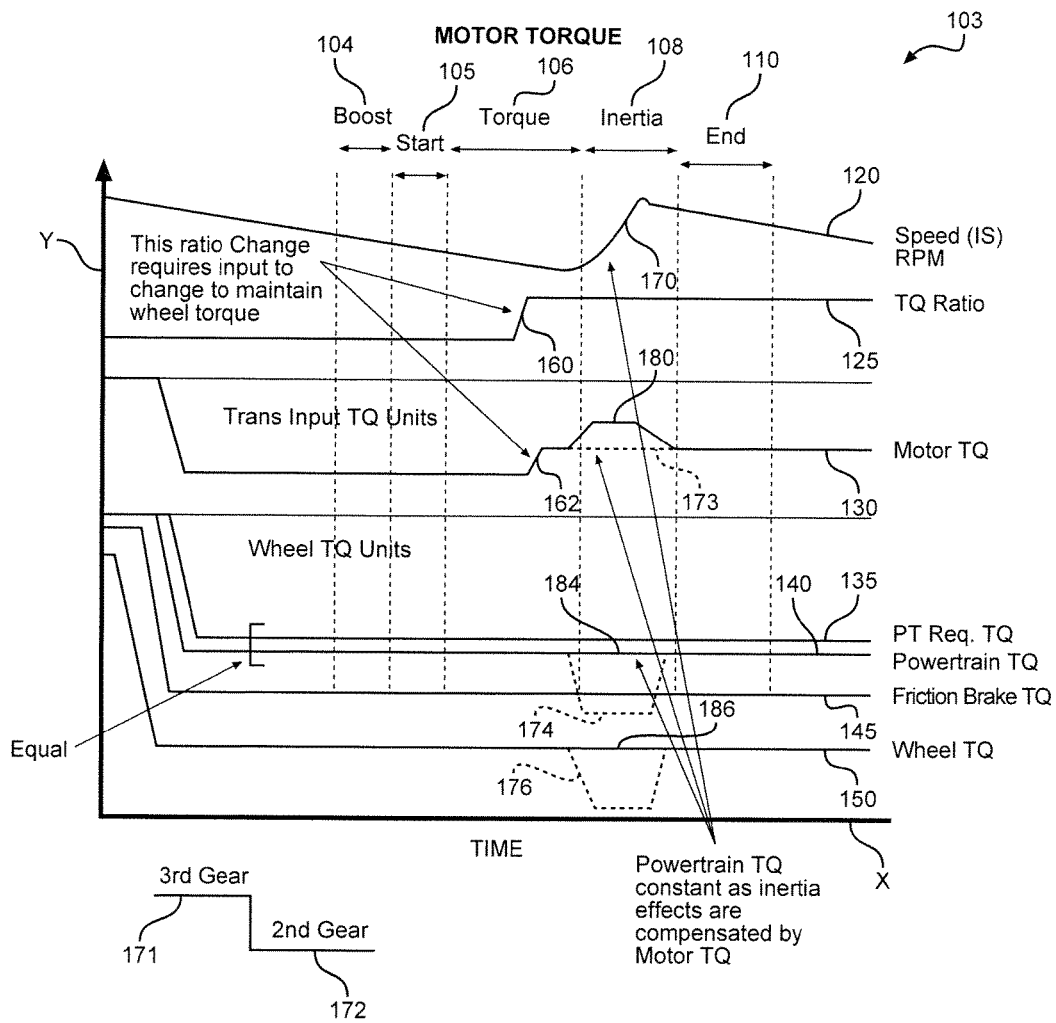
FIG. 2 is a graph of a downshift event in the powertrain of FIG. 1 from a high gear configuration to a low gear configuration with inertia effects compensated for by modulating torque from the electric motor.
Figure 3:
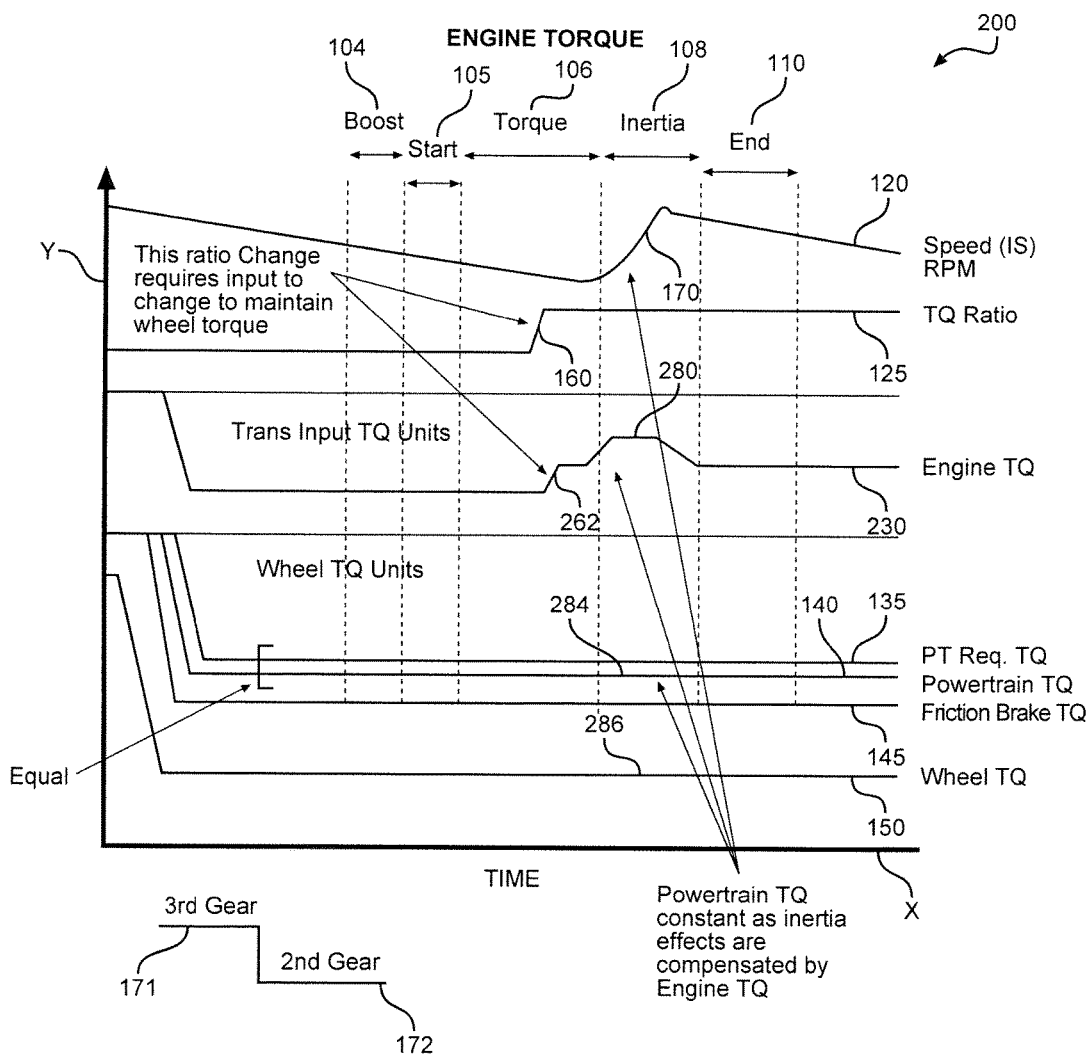
FIG. 3 is a graph of a downshift event in the powertrain of FIG. 1 from a high gear configuration to a low gear configuration with inertia effects compensated for by modulating torque from the engine.
Figure 4:
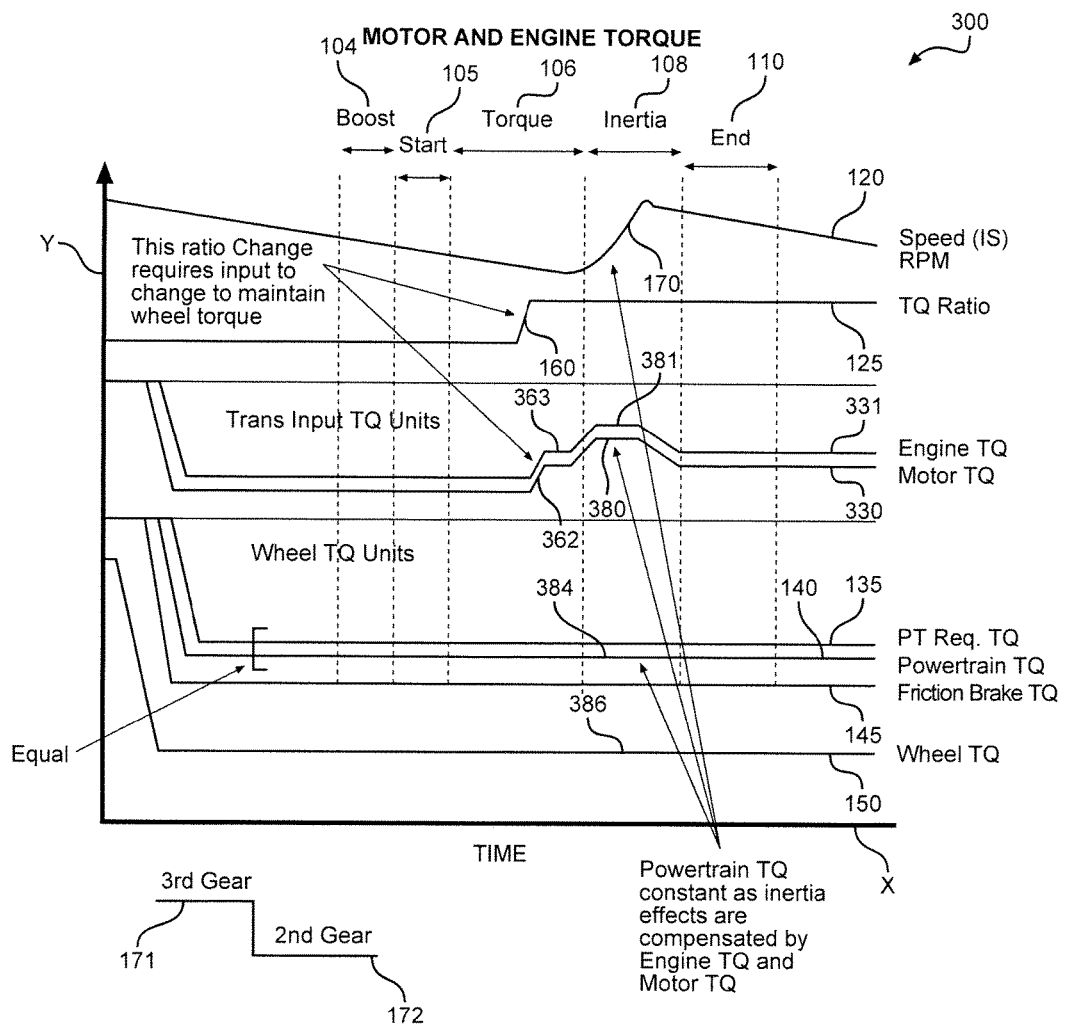
FIG. 4 is a graph of a downshift event in the powertrain of FIG. 1 from a high gear configuration to a low gear configuration with inertia effects compensated for by modulating torque from the electric motor and torque from the engine.
Figure 5:
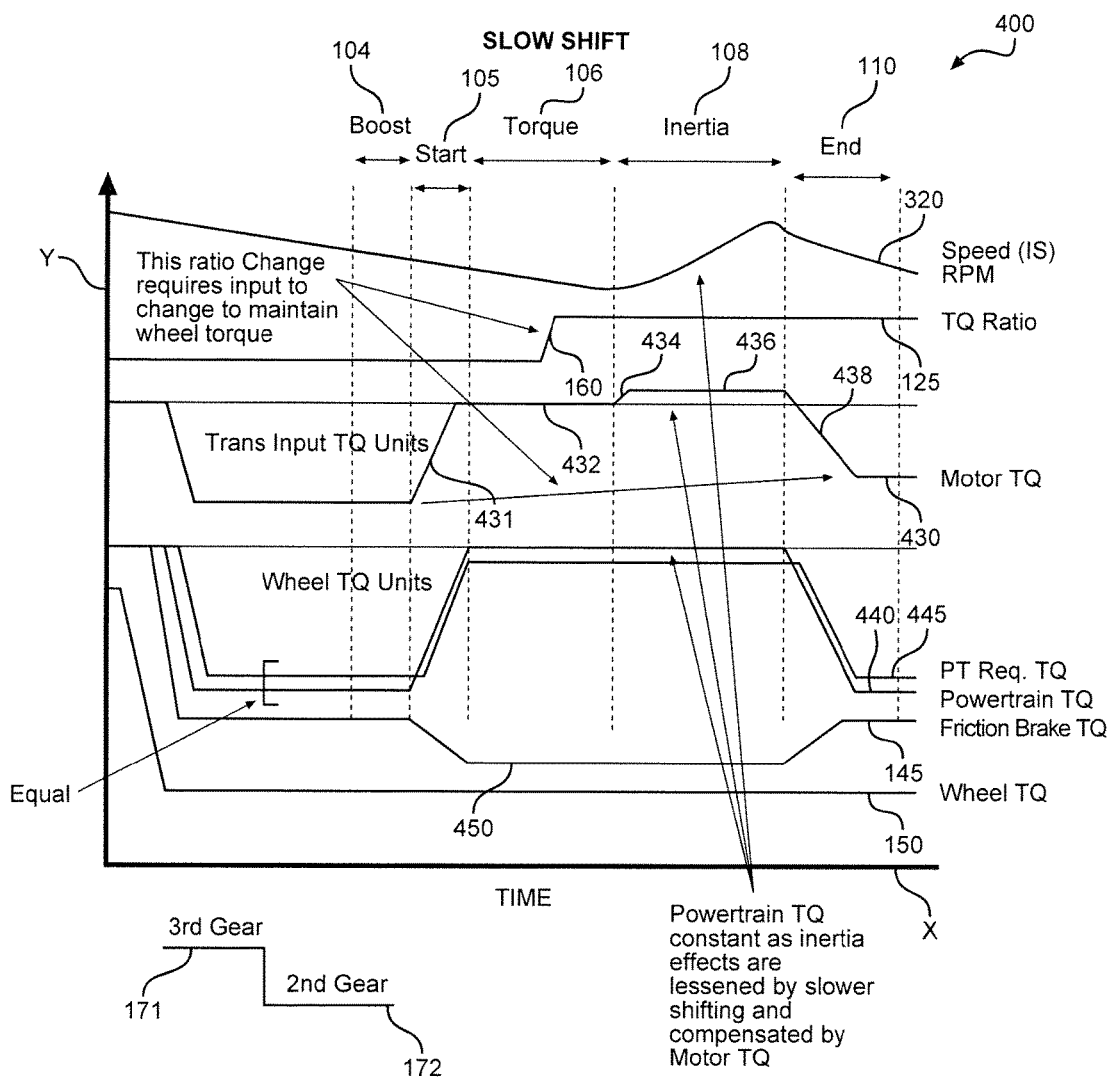
FIG. 5 is a graph of a downshift event in the powertrain of FIG. 1 from a high gear configuration to a low gear configuration with inertia effects compensated for by modulating torque from the electric motor and extending the time required for the shift.

Turning now to FIGS. 2-5 there are shown four different embodiments of the invention setting forth strategies for reducing shift shock in a downshift during regenerative braking which can be employed individually or in combination in accordance with the invention. More specifically, FIG. 2 illustrates an embodiment wherein electric motor torque is varied; FIG. 3 presents an embodiment wherein internal combustion engine torque is varied; FIG. 4 shows an embodiment varying both motor torque and engine torque; and finally FIG. 5 presents an embodiment wherein the length of the shift is extended and motor torque is varied. In each figure, an exemplary downshift from a $3^{rd}$ gear to a $2^{nd}$ gear is presented, with the X-axis representing time and the Y-axis representing either torque, torque ratio or speed depending on the particular curve of interest.

With specific reference to FIG. 2, a shift 103 is shown having five basic phases. A first or boost phase 104 is where on-coming friction element 72 is boosted to fill its friction element actuator quickly while off-going friction element 73 has its pressure set to a value just sufficient to hold input torque. In a second or start phase 105, off-going element 73 continues to hold transmission 50 in its current gear ratio while oncoming element 72 is still stroking. In a third or torque phase 106, off-going element 73 begins releasing, reducing its torque capacity, and oncoming element 72 continues increasing its torque capacity which results in the input torque transferring from the off-going element 73 to the oncoming element 72. Once a predetermined percentage of a coasting downshift speed change is completed, torque phase 106 is complete. In a fourth phase 108, oncoming element 72 continues to control the transmission input speed up to the new speed ratio. In the fourth phase, which is an inertia phase 108, transmission 50, under the effects of regenerative braking, will tend to vary powertrain torque 68 as the shift completes. Inertia phase 108 is exited when the shift is nearly complete. In an end phase 110, the oncoming pressure command is increased to a maximum command at the completion of the shift.

FIG. 2 further shows a plot of speed of the input shaft in RPM 120, torque ratio 125, motor torque 130, required powertrain torque 135, actual powertrain torque 140, friction brake torque 145 and wheel torque 150, which are all plotted as a function of time during the shift. As shown, speed 120 decreases during boost 104, start 105 and part of torque phase 106. During inertia phase 108, an increase 170 occurs as the gear ratios are shifted from a higher gear ratio 171 to a lower gear ratio 172, causing an inertia effect. Torque ratio 125 changes as shown by ramp 160 in torque phase 106. Motor torque 130 has a ramp 162 corresponding to ramp 106 in torque phase 106. In a conventional control system, no modulation of motor torque 130 would occur following ramp 162, thereby yielding a constant torque represented by dotted line 173. An inertia effect from ratio speed increase 170 will, if not compensated for, show up as a dip 174 in powertrain torque 140, as well as a dip 176 in wheel torque 150 which, in turn, is felt as a shift shock. However, when motor torque 130 is modulated in accordance with the invention and represented by bump 180, then powertrain torque 140 can be maintained constant as shown at 184, resulting in wheel torque 150 also being constant as shown at 186. Therefore, in accordance with one aspect of the invention, the torque signal 98 applied to electric motor 30 is regulated to modulate motor torque 130 such that powertrain torque 140 can be maintained constant, thereby avoiding shift shock during a downshift with regenerative braking.

In accordance with another aspect of the invention, the shift shock can be avoided in a downshift during regenerative braking by controlling engine torque as represented in FIG. 3. Initially, it will be recognized that FIG. 3 is similar to FIG. 2 such that only the differences will be discussed. Instead of using motor torque 130 to compensate for the inertia effects, a shift 200 is performed with modulated engine torque 230 such that, after increasing torque at ramp 262 to compensate for ratio change 160, an extra amount of torque shown at 280 is provided to hold powertrain torque 140 constant as shown at 284 resulting in wheel torque 150 being held constant as shown at 286. Shift 300 shown in FIG. 4 is also similar to shift 103 of FIG. 2 and, once again, only the differences will be discussed. Shift 300 uses both motor torque 330 and engine torque 331 to compensate for shift shock. Here, motor torque 330 is modulated such that, after increasing torque at ramp 362 to compensate for ratio change 160, an extra amount of torque shown at 380 is provided. Engine torque 331 is also modulated such that after increasing torque at ramp 363 to compensate for ratio change 160, an extra amount of torque shown at 381 is provided. The additional amounts of torque 380 and 381 act in combination to hold powertrain torque 140 constant as shown at 384, resulting in wheel torque 150 being held constant as shown at 386. Extra amounts of torque 380, 381 not have to have the same profile as shown. Therefore, the sum of torques 380, 381 are used to compensate for the inertial effects caused during shift 300 so that wheel torque 150 is maintained constant.

In FIG. 5, a shift 400 is shown that compensates for inertial effects by both modulating motor torque 430 and slowing shifting. Specifically, both the inertia phase 108 and the end phase 110 are lengthened and motor torque 430 is modulated much earlier. That is, motor torque 430 rises in start phase 104 with ramp 431 and is held relatively high through torque phase 106 as shown at 432. Further, modulation is shown at 434 and 436 during inertia phase 108 and torque 430 drops in end phase 110 as shown at 438. Motor torque 430 causes powertrain torque 440 and required powertrain torque 445 to significantly rise in start phase 105 and considerably drop in end phase 110, but stay constant through shift 400 in both torque phase 106 and inertia phase 108. Friction brake torque 145 is also modulated as shown at 450 so that wheel torque 150 stays constant through all phases of shift 400.

Based on the above, it should be readily apparent that the present invention sets forth various ways in which torque can be modulated for a downshift during regenerative braking in a hybrid vehicle such that shift shock is prevented or at least significantly minimized. In particular, input torques, friction braking and/or downshift timing is regulated to maintain output torque substantially constant. In connection with the invention, substantially constant at least requires no significant ramping or spiking of the output torque such that the output torque is, for all practical purposes, held constant through the downshift in order to substantially minimize or prevent shift shock during downshifting in a hybrid vehicle. In connection with the downshift, it should be understood that the torque and inertia phases of the downshift which are important in connection with maintaining the output torque substantially constant for controlling shift shock. In any case, although described with reference to preferred embodiments of the invention, it should be readily understood that various changes and/or modifications can be made to the invention without departing from the spirit thereof. In general, the invention is only intended to be limited by the scope of the following claims.

The invention claimed is:

1. A method for reducing shift shock in a hybrid electric vehicle powertrain system including an engine and a step ratio automatic transmission for delivering an output torque, the method comprising:
   transferring a first input torque from the engine to the transmission;
   effecting a downshift of the transmission during regenerative braking which tends to cause variations in the output torque; and
   modulating the first input torque during the downshift to counteract the variations and maintain the output torque substantially constant to reduce the shift shock.

2. The method of claim 1, further comprising:
   maintaining the output torque substantially constant; and
   preventing ramping or spiking of an output torque signal by controlling the first input torque from the engine.

3. The method of claim 2, further comprising:
   measuring an output torque signal indicative of the output torque, wherein maintaining the output torque substantially constant includes maintaining the output torque signal substantially constant.

4. The method of claim 1, further comprising:
   causing the engine to generate the first input torque and modulating an engine torque signal to cause the engine to modulate the first input torque.

5. The method of claim 1, wherein modulating the first input torque includes modulating the first input torque using a controller.

6. The method of claim 1, further comprising:
   causing a motor to generate a second input torque; and
   transferring the second input torque to the transmission.

7. The method of claim 6, further comprising:
   modulating the second input torque during the downshift to maintain the output torque substantially constant.

8. The method of claim 6, further comprising sending a motor torque signal to the motor to modulate the second input torque.

9. The method of claim 1, further comprising:
   taking time to complete the downshift; and
   extending the time taken to complete the downshift to maintain the output torque substantially constant.

10. The method of claim 1, further comprising:
    causing friction brakes mounted at drive wheels to apply a friction braking force; and
    varying the friction braking force to maintain the output torque substantially constant, wherein the output torque is a wheel torque.

11. The method of claim 10, wherein causing the friction brakes to apply the friction braking force includes sending a friction braking signal to the friction brakes and varying the friction braking force includes varying the friction braking signal.

12. The method of claim 10, further comprising:
    determining a timing for applying the friction braking force by predicting a lag time associated with applying the friction braking force and compensating for the lag time.

13. The method of claim 10, further comprising:
    decreasing an amount of friction braking during a torque phase of the downshift.

14. The method of claim 13, further comprising:
    restoring the amount of friction braking during an inertia phase of the downshift.

15. The method of claim 1, further comprising:
    removing the regenerative braking before the downshift; and
    reinstating the regenerative braking after the downshift.

16. The method of claim 1, further comprising:
    increasing an amount of regenerative braking during both a torque phase and an inertia phase of the downshift.

17. A hybrid electric vehicle powertrain system comprising:
    a step ratio automatic transmission including multiple gear ratios for delivering an output torque to a set of drive wheels;
    an engine for generating a first input torque that is transferred to the transmission;
    a controller configured to:
        effect a downshift of the transmission during regenerative braking which tends to cause variations in the output torque; and
        modulate the first input torque during the downshift to counteract the variations and maintain the output torque substantially constant thereby reducing shift shock during the down shift.

18. The powertrain system of claim 17, further comprising:
    an electric motor for generating a second input torque that is transferred to the transmission.

19. The powertrain system of claim 18, wherein the controller is further configured to modulate the second input torque during the downshift to maintain the output torque substantially constant.

20. The powertrain system of claim 17, further comprising:
    friction brakes mounted at the set of drive wheels for applying a friction braking force, wherein the controller is further configured to vary the friction braking force to maintain the output torque substantially constant, wherein the output torque is a wheel torque.

21. A method for reducing shift shock in a hybrid electric vehicle powertrain, the method comprising:
- transferring an input torque from an engine to a transmission in the powertrain;
- effecting a downshift of the transmission during regenerative braking which tends to cause variations in a output torque from the transmission; and
- modulating the input torque during the downshift to counteract the variations and maintain the output torque substantially constant to reduce the shift shock.

22. The method of claim 21, wherein the shift shock is reduced throughout the downshift.

* * * * *